United States Patent [19]
Lindenman et al.

[11] Patent Number: 5,971,418
[45] Date of Patent: Oct. 26, 1999

[54] GOOSENECK HITCH ASSEMBLY AND METHOD OF INSTALLATION

[75] Inventors: Thomas W. Lindenman, South Bend; Richard W. McCoy, Granger, both of Ind.

[73] Assignee: Reese Products, Inc., Elkhart, Ind.

[21] Appl. No.: 08/846,698

[22] Filed: Apr. 30, 1997

Related U.S. Application Data

[60] Provisional application No. 60/028,686, Oct. 18, 1996, and provisional application No. 60/030,275, Nov. 4, 1996.

[51] Int. Cl.⁶ ........................................................ B60D 1/54
[52] U.S. Cl. .................................... 280/491.1; 280/417.1; 280/457; 280/491.3; 280/901
[58] Field of Search .............................. 280/491.1, 491.3, 280/504, 511, 901, 415.1, 417.1, 457

[56] References Cited

U.S. PATENT DOCUMENTS

| 4,256,324 | 3/1981 | Hamilton . | |
|---|---|---|---|
| 4,540,194 | 9/1985 | Dane | 280/491.1 |
| 4,657,274 | 4/1987 | Mann et al. . | |
| 5,143,393 | 9/1992 | Meyer . | |
| 5,435,585 | 7/1995 | Chambers . | |
| 5,472,222 | 12/1995 | Marcy . | |
| 5,571,270 | 11/1996 | Larkin | 280/491.1 |

*Primary Examiner*—Robert J. Oberleitner
*Assistant Examiner*—Pamela J. Lipka
*Attorney, Agent, or Firm*—King and Schickli

[57] ABSTRACT

A gooseneck hitch assembly includes a hitch ball assembly having a hitch ball and a housing and a mounting assembly for securing the hitch ball assembly to the frame of a vehicle. The hitch ball is pivotally connected to the housing and includes a conveniently located grease fitting, a pivotally mounted security door with a torsion spring to hold the door in fully open and closed positions and a latch for securing the door in a closed position and the hitch ball in a towing position. A method of mounting the gooseneck hitch assembly to the towing vehicle is also disclosed.

5 Claims, 5 Drawing Sheets

GOOSENECK HITCH ASSEMBLY AND METHOD OF INSTALLATION

This application claims the benefit of U.S. Provisional Application No. 60/028,686, filed Oct. 18, 1996 and U.S. Provisional Application No. 60/030,275 filed Nov. 4, 1996.

TECHNICAL FIELD

The present invention relates generally to the towing field and, more particularly, to a new and simple gooseneck hitch assembly and a method of installing that gooseneck hitch assembly on a pick-up truck.

BACKGROUND OF THE INVENTION

Ball hitches of the gooseneck type wherein the hitch ball is mounted in the bed of a pick-up truck between the rear wheels of the truck are well known in the art. Examples of such gooseneck hitches are presented in, for example, U.S. Pat. Nos. 4,256,324 to Hamilton; 4,657,274 to Mann et al.; 5,143,393 to Meyer; 5,435,585 to Chambers; and 5,472,222 to Marcy. The goal of these designs is to provide as much of the gooseneck hitch assembly as possible beneath the bed of the pick-up truck. Further, the hitch balls themselves are all removable or retractable so that when the hitch is not in use, the hitch ball may be removed or retracted so as not to obstruct the bed of the pick-up truck in any significant manner.

While such gooseneck hitch assemblies have become very popular, all such designs are generally difficult to install. In most situations, it is very difficult to properly position the supporting subframe of the hitch assembly underneath the bed of the pickup truck between the truck frame rails, the overlying bed and the underlying exhaust system, electrical lines, fuel lines and other vehicle components. A need is therefore identified for a gooseneck hitch assembly that may be easily installed by following simple instructions so that the installation process may be completed in a quick and efficient manner.

Further, hitch assemblies have generally failed to include or only included in an inconvenient location under the bed of the pick-up truck a grease fitting for lubricating the mechanism that allows the hitch ball to be moved between the towing and storage positions. Of course, a grease fitting under the bed of the pickup truck is so inconvenient as to often go unutilized. This neglect often results in damage to the mechanism overtime. A need is, therefore, also identified for a gooseneck hitch assembly that may be easily and conveniently lubricated so as to maintain the moving parts of the hitch ball pivotal connection in peak operating condition at all times.

SUMMARY OF THE INVENTION

Accordingly, it is a primary object of the present invention to provide a gooseneck trailer hitch assembly and an installation method for a gooseneck trailer hitch assembly overcoming the above-described limitations and disadvantages of the prior art.

A more specific object of the present invention is to provide a method of installing a gooseneck hitch assembly on a pick-up truck utilizing a straightforward method that simplifies installation thereby making installation much easier and drastically reducing installation time.

An additional object of the present invention is to provide an improved gooseneck hitch assembly including a conveniently located grease fitting for lubrication of the pivotal connection of the hitch ball with the supporting housing.

Yet another object is the provision of a gooseneck hitch assembly providing reliable operation by means of a security door latch that positively holds the hitch ball in a towing position and a torsion spring that positively biases and holds that security door in fully closed and fully open positions.

Still another object of the present invention is to provide a gooseneck hitch assembly with an easily accessible finger ring/loop to manipulate/open the security door and partially raise the hitch ball. This allows better mechanical advantage thus allowing more spring pressure bias with the locking detent.

A further object of the present invention is to provide a gooseneck hitch assembly with safety chain anchors that are aligned with the hitch ball substantially perpendicular to the longitudinal axis of the towing vehicle so as to provide a better overall geometry that prevents the safety chains from binding during maneuvering and particularly during the negotiation of tight turns such as when towing a trailer around or through a parking lot or campground.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a gooseneck hitch assembly is provided for installation on a pick-up truck or other vehicle. The hitch assembly includes a hitch ball assembly of a type well known in the art including a housing and retractable hitch ball. Additionally, the hitch assembly includes a mounting subassembly comprising a two-section telescoping framework. Each section of the framework includes an end plate mounted to a pair of elongated tube struts. Each tube strut of a pair is coextensive and parallel with the other of the pair. The tube struts of one section are telescopingly received in the tube struts of the other section. Fasteners are also provided to secure the end plates of the mounting subassembly to the frame of the vehicle.

The hitch ball assembly may be further characterized as including a pivotal connection between the hitch ball and housing whereby the hitch ball is selectively displaceable between an upright towing position and an inclined storage position. Further, a grease fitting is provided for lubricating this pivotal connection. The grease fitting is carried on the hitch ball and is exposed and easily assessable on an upwardly facing portion of the hitch ball when the hitch ball is in the storage position. This allows convenient lubrication of the pivotal connection so as to insure that the gooseneck hitch assembly is maintained in peak operating order.

Preferably, the safety chain anchors include means in the form of torsion springs for positively holding those anchors in the safety chain receiving and storage positions. Additionally, it is preferred that the safety chain anchors be carried on the housing substantially in alignment with the hitch ball along a first line substantially perpendicular to a second line corresponding to the longitudinal axis of the vehicle to which the gooseneck hitch assembly is mounted. This orientation prevents the safety chains from binding with the trailer and hitch ball connection when maneuvering around tight corners such as commonly occurs in parking lots or trailer campground facilities.

In accordance with another aspect of the present invention, the hitch ball assembly may include a pair of safety chain anchors that are pivotally connected to the housing. Each of the safety chain anchors is selectively displaceable between a safety chain receiving position and a storage position. When in the storage or folded down position, at least one of the safety chain anchors overlies and protects the grease fitting thereby preventing that fitting from being damaged inadvertently through contact from a blunt object such as a rock or other article dropped in the bed of a pick-up truck.

In accordance with still another aspect of the present invention, the gooseneck hitch assembly includes a security door pivotally connected to the housing. The security door is selectively displacable between an open position and a closed position. Further, a latch is provided for securing the security door in the closed position.

More specifically, the latch is carried by the hitch ball and may, for example, take the form of a spring loaded detent. Accordingly, when the hitch ball is in the towing position, the security door may be closed and the latch is biased so as to lock the security door in the closed position. When it is desired to displace the hitch ball to the storage position, the detent latch is pressed and a finger loop provided on the security door is engaged so as to manually swing the door by its pivotal connection into the open position. The hitch ball may then be displaced to its storage position and the security door again closed.

In accordance with yet another aspect of the present invention, a method is provided for installing a hitch assembly in the bed of a pick-up truck. The method initially involves the locating of a registration point in the bed of the pick-up truck to which the hitch assembly is being mounted. Next is the positioning of a template over the bed relative to the registration point.

Next is the drilling of the access holes in the bed and mounting holes through the frame rails. This is followed by the cutting of the hitch assembly opening in the bed. This is then followed by the positioning of the mounting subassembly under the bed on the frame of the pick-up truck. Next is the positioning of the hitch ball assembly onto the mounting subassembly through the hitch assembly opening. Further, the method includes the securing of the mounting subassembly to the frame and the hitch ball assembly to the mounting subassembly. In this way, it is possible to quickly and accurately position and install a gooseneck hitch assembly on a pick-up truck.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 3a is a detailed, rear elevational view showing the locking of the security door;

Reference will now be made in detail to the present preferred embodiment of the invention, an example of which is illustrated in the accompanying drawing.

DETAILED DESCRIPTION OF THE INVENTION

Figure 1:
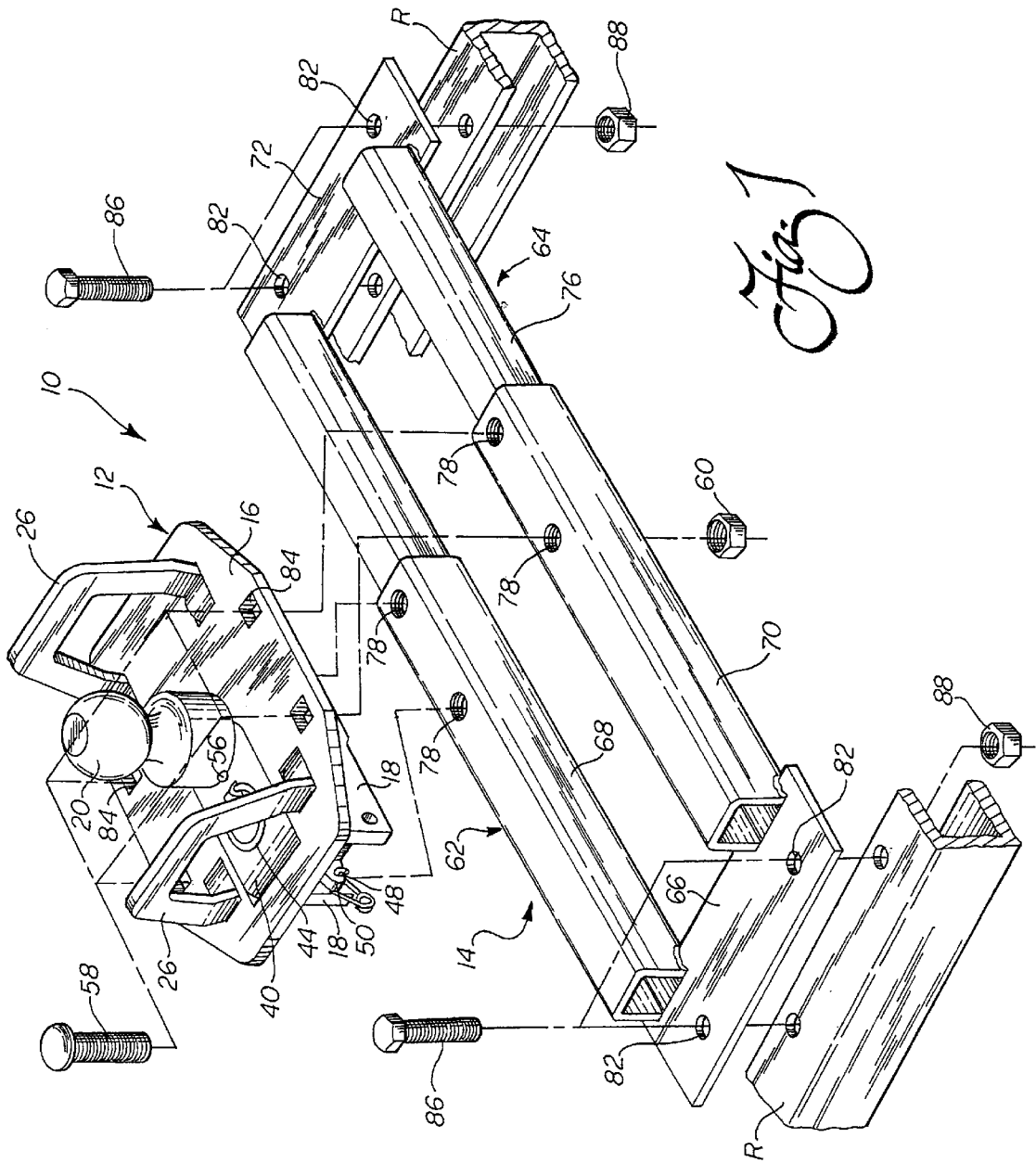
FIG. 1 is a partially exploded, perspective view of the hitch assembly of the present invention including the hitch ball assembly and the mounting subassembly.

Reference is now made to FIG. 1 showing the hitch assembly 10 which may be readily and easily installed in the bed of a pick-up truck. Hitch assembly 10 includes a hitch ball subassembly, generally designated by reference numeral 12, and a mounting subassembly, generally designated by reference numeral 14.

As shown in the drawing figures, the hitch ball subassembly 12 includes a housing comprising a floor plate 16 and a pair of spaced underlying support plates 18. Preferably, these are constructed from heavy gauge steel and the plates 16 and 18 are welded together. A hitch ball 20 is pivotally connected to the support plates 18 of the housing by means of pins 22. A grease fitting 24 is mounted to the hitch ball 20 over an internal passageway or conduit (not shown) that allows the pivotal connection of the pins 22 with the support plates 18 to be lubricated. As should be appreciated from reviewing FIG. 5, the grease fitting 24 is provided on the upwardly projecting face of the hitch ball 20 when the hitch ball is pivoted into the storage position (see also FIG. 2). Advantageously, this conveniently located grease fitting 24 encourages greasing and lubrication of the parts so as to maintain the hitch assembly 10 in peak operating conditions. This allows easy manipulation or displacement of the hitch ball 20 between the storage position shown in FIGS. 2 and 5 and the towing position best shown in FIG. 1 but also shown in FIGS. 3, 3a and 4.

The hitch ball subassembly 12 also includes a pair of safety chain anchors 26, each substantially u-shaped. Each of the safety chain anchors includes a pair of integrally formed mounting loops 28 and a pin or stub shaft 30 is provided for connecting each end of a mounting loop to one of the support plates 18 of the housing (see also FIG. 6). Further, each safety chain anchor 26 includes a projecting tab 32 carrying an aperture 34. A torsion spring 36 includes a first end for engaging in the aperture 34 and a second end for engaging in an aperture 38 in one of the support plates 18 of the housing. Each torsion spring 36 functions to maintain and provide a positive pressure for holding a safety chain anchor 26 in either the safety chain receiving position (upright position) shown in FIGS. 1, 3 and 4 or the inclined storage position shown in FIGS. 2 and 5. As should also be appreciated from reviewing FIG. 5, when in the storage position, one of the safety chain anchors 26 is folded so as to overlie and protect the grease fitting 24 from injury from blunt objects that may be dropped into or otherwise positioned in the vehicle to which the hitch assembly 10 is mounted.

Figure 3:
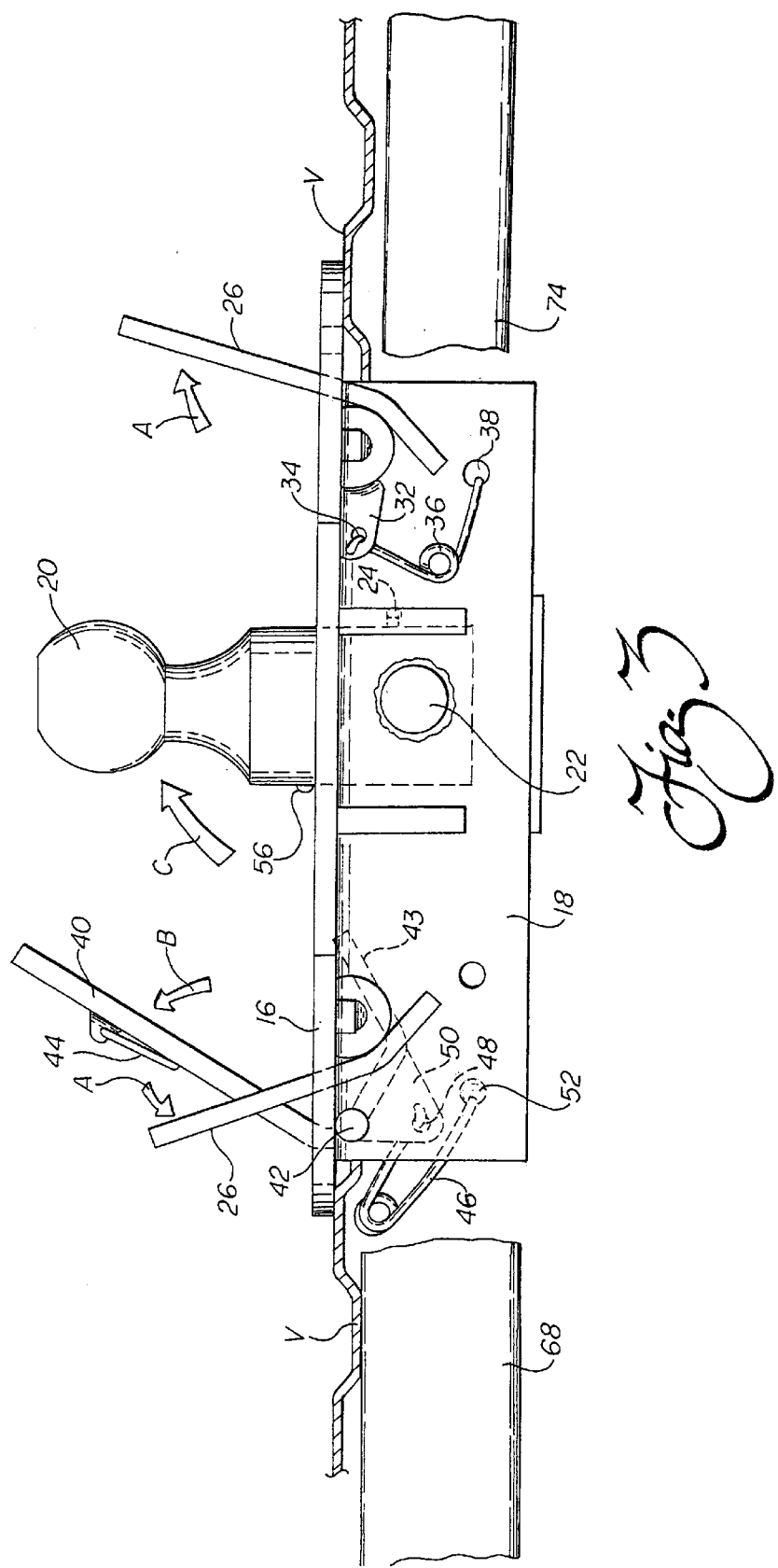
FIG. 3 is a rear elevational action view illustrating the manipulation of the various components of the present invention in order to place the hitch assembly in the towing position.

As further shown in the drawing figures, the hitch ball subassembly 12 also includes a security door 40 that is likewise mounted by means of a pin 42 to the support plates 18 of the housing. As best shown in FIGS. 1, 3 and 5, security door 40 carries a finger loop 44 that may be engaged with the fingers and utilized to displace the security door from the closed position shown in FIGS. 1 and 5 to the opened position shown in FIGS. 3 and 4. When the security door 40 is open, the hitch ball 20 may be pivoted between the towing position in which it projects vertically upwardly and the storage position in which it is inclined and received between the support plates 18 beneath the floor plate 16. When the hitch ball 20 is in the storage position, the security door 40 may be closed flush with the floor plate 16 and the safety chain anchors 26 may be folded downwardly into the storage position so as to directly overlie the floor plate.

Figure 2:
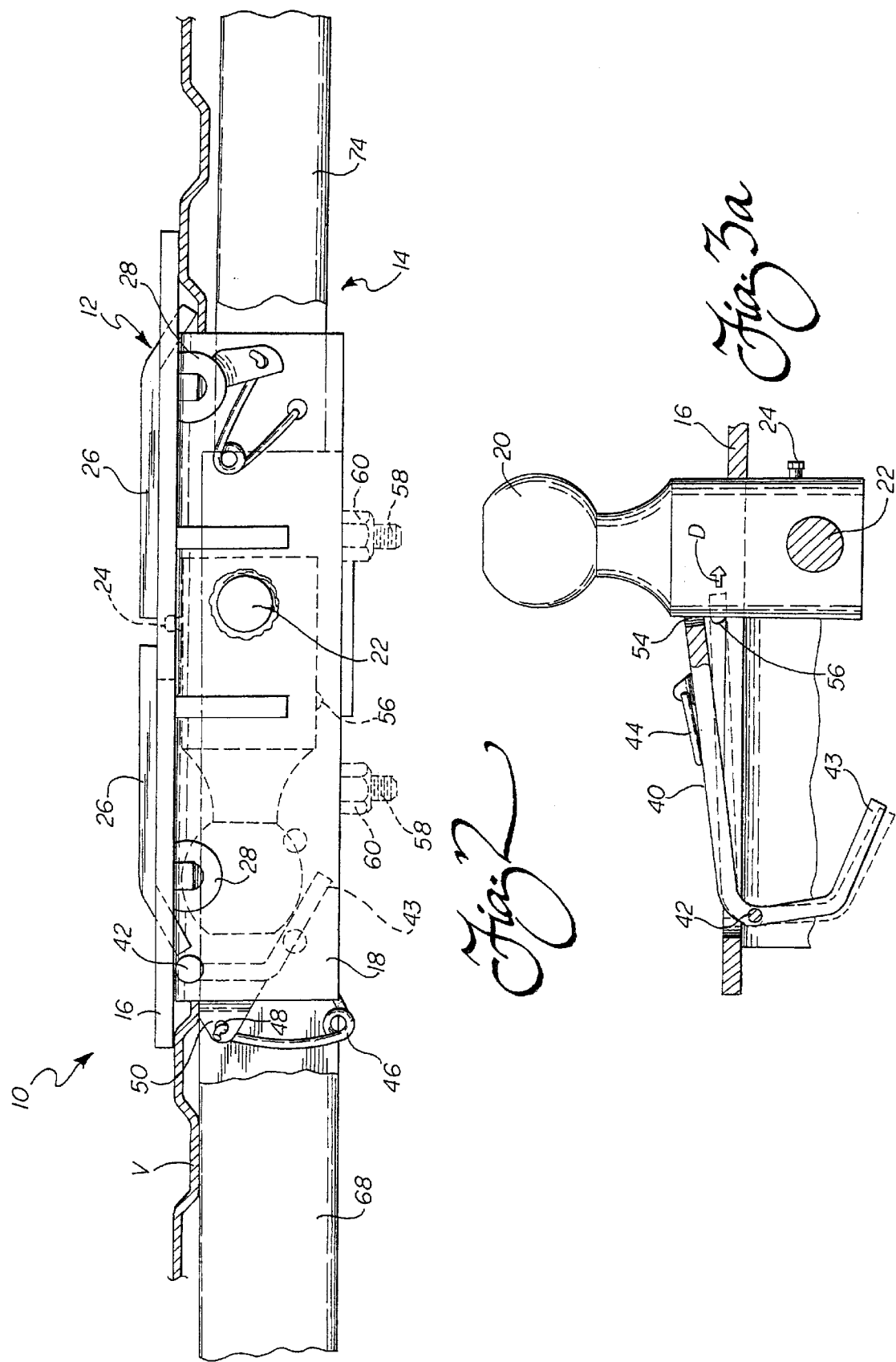
FIG. 2 is a rear elevational view of the hitch assembly of the present invention in the storage position.

In this position shown in FIG. 2, the bed V of the pick-up truck or other vehicle to which the hitch assembly 10 is mounted is free to receive materials such as plywood sheet without any substantial interference. A torsion spring 46 having one end secured in an aperture 48 in a lug 50 carried by the security door 40 and another end secured in an aperture 52 in one of the support plates 18 provides a positive pressure that maintains the security door 40 in either the closed position shown in FIG. 2 or the open position shown in FIGS. 3 and 4 with the necessary clearance to allow the displacement of the hitch ball 20 to the towing position.

Figure 4:
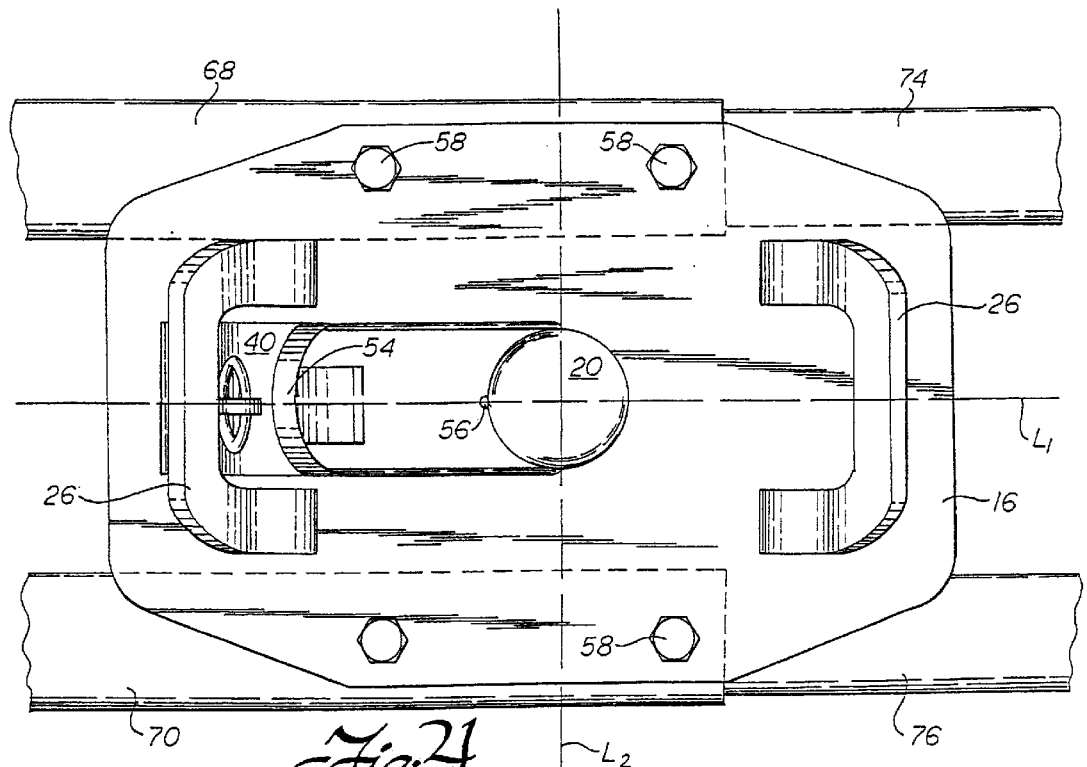
FIG. 4 is a top plan view of the hitch assembly with the hitch ball in the towing position and the security door open.
Figure 5:
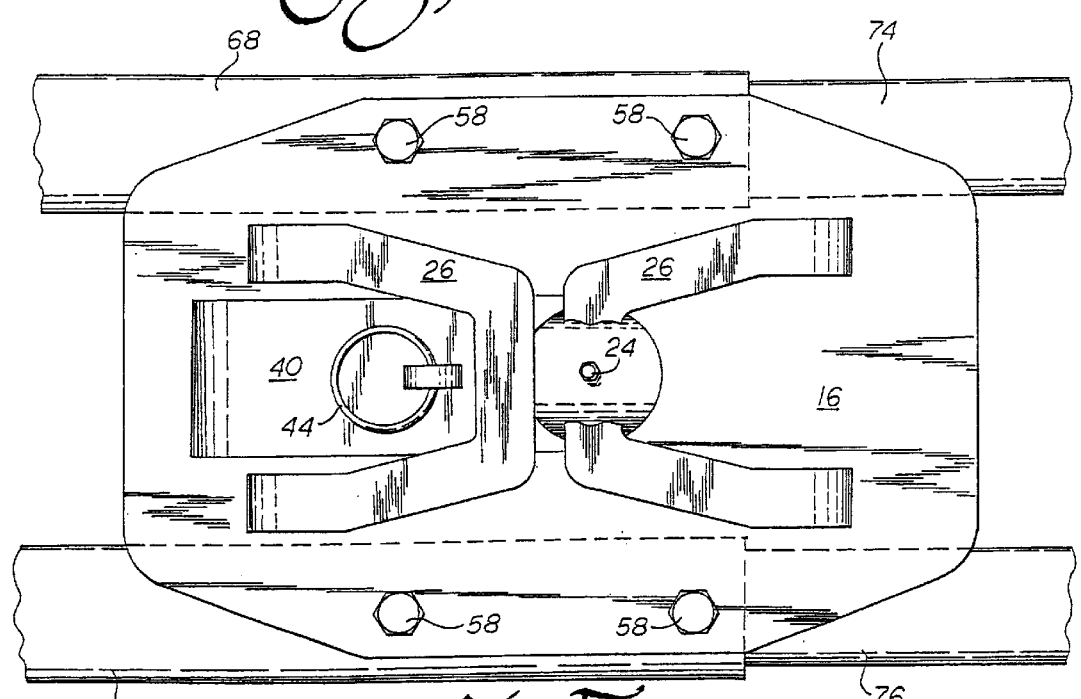
FIG. 5 is a top plan view showing the hitch assembly in the closed position.

When it is desired to utilize the hitch assembly 10 for towing, the operator first displaces the safety chain anchors 26 from the storage position shown in FIG. 2 outwardly in the direction of action arrows A to the safety chain receiving position best shown in FIGS. 1, 3 and 4. Next, the finger loop 40 is engaged and the security door 40 is pivoted in the direction of action arrow B (see FIG. 3) to the fully opened positioned. There it is held in place by the torsion spring 46. When opened, the distal end 43 of the security door 40 engages and partially raises the hitch ball 20. This allows the necessary clearance to allow the hitch ball 20 to be fully pivoted in the direction of action arrow C from the storage position shown in FIG. 2 the towing position shown in FIG. 3. Next, the security door 40 is closed. As this is done, the leading edge 54 of the security door 40 engages a latch, generally designated by reference numeral 56 carried on the hitch ball 20. Preferably, the latch 56 comprise a spring loaded detent which upon engagement with the leading edge 54 is depressed inwardly into the hitch ball 20 in the direction of the action arrow D shown in FIG. 3a. This allows the security door 40 to be fully closed so that the security door is flush with the floor plate 16 (see FIG. 1). In this position, the security door 40 is clear of the detent 56 which is biased by the spring outwardly so as to lap over the leading edge 54 thereof and positively maintain the security door 40 in the closed position. This positive latching action insures that the hitch ball 20 is maintained in the towing position thus providing a positive and secure structure of the highest integrity for towing a trailer behind a towing vehicle.

Another important aspect of the present invention is demonstrated with reference FIGS. 1 and 4. Specifically, it should be noted that the safety chain anchors 26 are substantially aligned with the hitch ball 20 along a first line that runs substantially perpendicular to the longitudinal axis of the towing vehicle (note, lines $L_1$ and $L_2$ in FIG. 4). As a result of this geometric configuration, the safety chains attached to the safety chain anchors 26 are prevented from engaging and binding upon the hitch ball 20 even when maneuvering through sharp turns such as often necessitated when negotiating parking lots or trailer camping sites. Thus, the prospect of damaged and broken safety chains as a result of binding commonly associated with prior art safety chain connection schemes where the safety chain connection is forward of the hitch ball is substantially eliminated.

Figure 6:
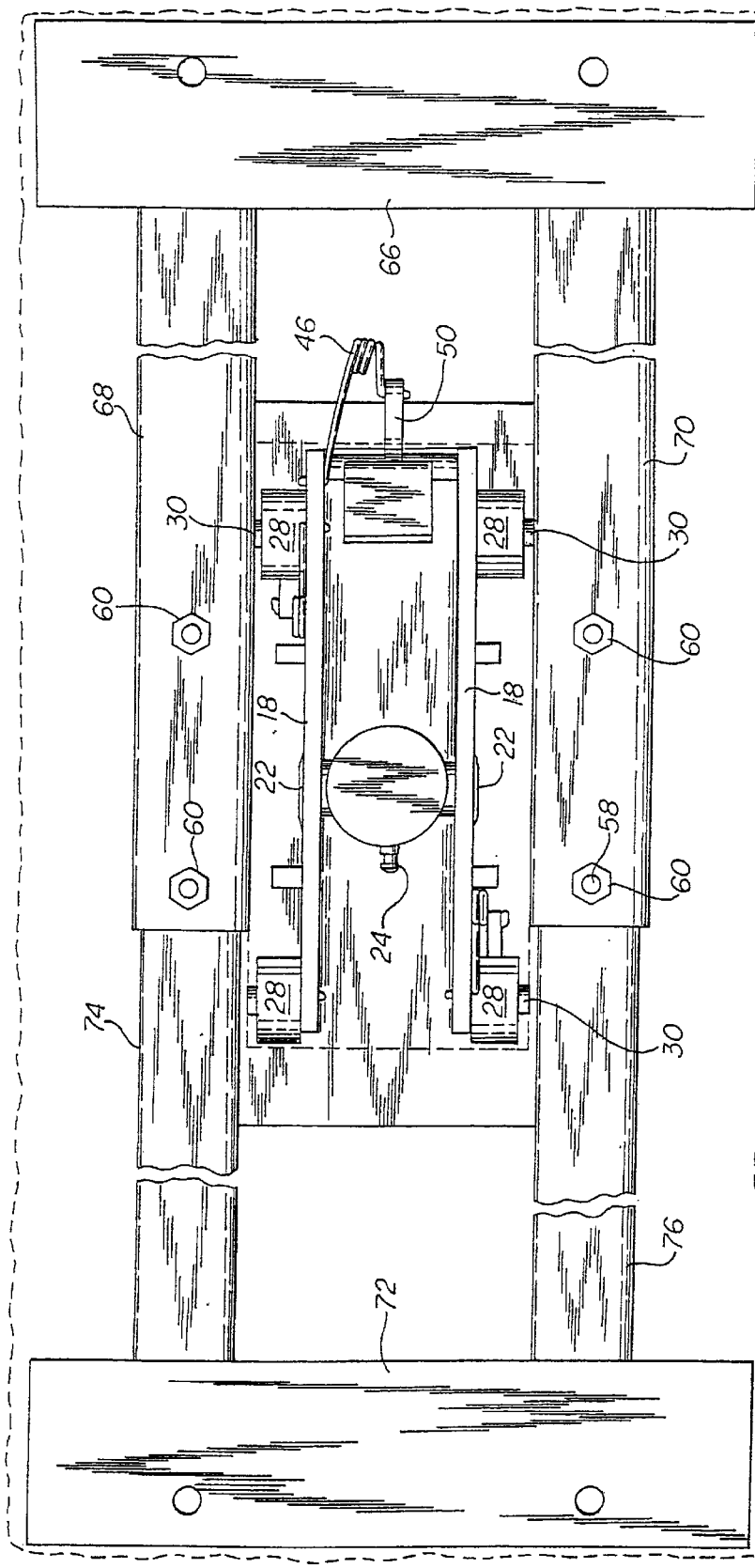
FIG. 6 is a bottom plan views of the hitch assembly.

As should be appreciated from viewing FIGS. 1 and 6, the hitch ball subassembly 12 is secured to the mounting subassembly 14 by means of four bolts 58 and cooperating nuts 60. When properly positioned, the hitch ball subassembly 12 overlies the bed V of the vehicle while the mounting subassembly 14 underlies the bed. The mounting subassembly will now be described in detail.

The mounting subassembly 14 comprises two cooperating telescoping sections 62, 64. The first section 62 includes an end plate 66 welded at one end to a tubular strut or brace 68 and at the other end to a tubular strut or brace 70. As should be appreciated the tubular braces 68, 70 are coextensive and parallel. Similarly, the second section 64 includes an end plate 72 connected at one end to a tubular strut or brace 74 and at the other end to a tubular strut or brace 76. The tubular braces 74, 76 are also coextensive and parallel.

As should be further appreciated from viewing FIGS. 1, 4, 5 and 6 the tubular braces 74, 76 are dimensioned for receipt and free sliding movement through the tubular braces 68, 70. Accordingly, a freely telescoping mounting subassembly 14 is provided. Advantageously, since this mounting subassembly 14 includes only two telescoping sections 62, 64, it may be collapsed or contracted to a sufficiently narrow width dimension to allow the mounting subassembly to be easily maneuvered around fuel lines, electrical lines, exhaust system components as well as other vehicle components that might otherwise represent an obstruction to its installation between the frame rails of the pick-up truck in a manner described in greater detail below.

Advantageously, the hitch assembly 10 may be easily installed on the pick-up truck. As a preliminary step on some vehicles it may be necessary to remove the spare tire and/or an exhaust heat shield. The first step in the actual installation process is the locating of a registration point in the bed of the pick-up truck. This is done by measuring forward from the back of the truck bed a predetermined number of inches: the distance varying depending on the make and model pick-up truck. This measurement is centered between the left and right hand sides of the bed.

Next is the marking of a hitch assembly opening on the bed. This is done based upon the location of the registration point. Specifically, a 12⅝×7¼ inch rectangle is located on the pickup truck bed utilizing the registration mark as the ball center: that is, the point that will be the center of the hitch ball once it is installed and positioned for towing. This is done by positioning a template so that it is the centered between the fender wells with the ball center as marked on the template corresponding with the ball center registration point marked on the truck bed. The template is then taped into position.

The points of the template represent the centers of ten 1⅛ inch diameter holes to be sawed using a 1⅛ inch diameter hole saw. Two additional holes are drilled on each end over the truck frame rails. Each of the fourteen holes is first drilled with a ⅛ inch drill bit. A 1⅛ inch hole saw is then used to cut the ten center holes while a 1⅛ inch drill bit is used to drill the four end holes through the bed and the underlying frame rails. Of course, prior to any drilling or cutting the installer checks to confirm the necessary clearance exists and that there is no interference with fuel lines, brake lines, electrical lines, etc.

Next a saber saw is used to cut the hitch assembly opening in the bed. Specifically, the opening is cut along the template lines which run between and connect the ten holes previously cut with the hole saw. This method allows for smooth, round corners as opposed to sharp, square corners.

Next is the positioning of the mounting subassembly 14 under the bed of the pick-up truck onto the frame. More specifically, the two sections 62, 64 are telescopingly contracted or collapsed so as to minimize the width of the mounting subassembly 14. This makes it easier to manipulate the mounting subassembly 14 around lines, exhaust pipes and any other obstacles to placement. Once adjacent the overlying bed and above the frame rails, the sections 62, 64 are telescopingly extended and one end plate is placed so as to rest on the top flange of each frame rail R while straddling the hitch assembly opening H. With the holes 78 in the braces 68, 70 and the holes 78 in the braces 74, 76 now in alignment, the hitch ball subassembly 12 is positioned onto the mounting subassembly 14 so that the support plates 18 of the housing fall between the braces 68, 70 and 74, 76. The floor plate 16 of the housing overlies the braces 68, 70, 74, 76 and includes four apertures 84 that align with the brace holes 78. Carriage bolts 58 are inserted through the aligned apertures 84 and holes 78 in order to hold this relative positioning.

Next, a carriage bolt 86 is inserted through each access hole into each square end plate hole 82. This is then followed by the securing of the mounting subassembly 14 to the frame and the hitch ball subassembly 12 to the mounting subassembly. More specifically, nuts 60, 88 and lock washers (not shown) are secured to the bolts 58, 86 previously inserted in the holes 78 and the end plate holes 82, respectively. Each of these are, of course, tightened to the desired torque in order to provide a secure connection. The access holes drilled in the bed over the frame rails are then capped to provide a finished aesthetically pleasing appearance.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A gooseneck hitch assembly, comprising:

a hitch ball assembly including a hitch ball and a housing;

a mounting assembly for securing said hitch ball assembly to a frame of a vehicle, said hitch ball assembly further being characterized by (a) a pivotal connection between said hitch ball and said housing whereby said hitch ball is selectively displaceable between an upright towing position and an inclined storage position and (b) a grease fitting for lubricating said pivotal connection carried on said hitch ball, said grease fitting being exposed and easily accessible on an upward facing portion of said hitch ball when said hitch ball is in said storage position so as to allow convenient lubrication of said pivotal connection; and a pair of safety chain anchors pivotally connected to said housing whereby each of said safety chain anchors is selectively displaceable between a safety chain receiving position and a storage position, at least one of said safety chain anchors overlying and protecting said grease fitting in said storage position.

2. A gooseneck hitch assembly, comprising:

a hitch ball assembly including a hitch ball and a housing; and a mounting assembly for securing said hitch ball assembly to a frame of a vehicle;

said hitch ball assembly being further characterised by a pair of safety chain anchors carried on said housing substantially in alignment with said hitch ball along a first line substantially perpendicular to a second line corresponding to a longitudinal axis of said vehicle to which said gooseneck hitch assembly is mounted.

3. The gooseneck hitch assembly set forth in claim 2, further including means for pivotally mounting said safety chain anchors on said housing so that each safety chain anchor is selectively displaceable between a safety chain receiving position and a storage position.

4. The gooseneck hitch assembly set forth in claim 3, further including means for positively holding said safety chain anchors in said safety chain receiving and storage positions.

5. The gooseneck hitch assembly set forth in claim 4, wherein said holding means is a torsion spring operatively connected between each of said safety chain anchors and said housing.

\* \* \* \* \*